US009648151B2

(12) United States Patent
Wormald et al.

(10) Patent No.: US 9,648,151 B2
(45) Date of Patent: *May 9, 2017

(54) LOCATION OF A FUEL CELL ON A MOBILE DEVICE

(75) Inventors: Chris Wormald, Kitchener (CA); Raymond Reddy, Toronto (CA); Lyall Kenneth Winger, Waterloo (CA)

(73) Assignee: BlackBerry Limited, Waterloo, ON ( * ) Notice: Subject to any disclaimer, the term of this patent is extended or adjusted under 35 U.S.C. 154(b) by 490 days.

This patent is subject to a terminal disclaimer.

(21) Appl. No.: 13/365,664

(22) Filed: Feb. 3, 2012

(65) Prior Publication Data

US 2012/0135277 A1    May 31, 2012

Related U.S. Application Data

(63) Continuation of application No. 12/394,641, filed on Feb. 27, 2009.

(51) Int. Cl.
*H04M 1/02* (2006.01)
*H01M 8/04291* (2016.01)
*H01M 8/1018* (2016.01)

(52) U.S. Cl.
CPC ..... *H04M 1/0262* (2013.01); *H01M 8/04291* (2013.01); *H01M 2008/1095* (2013.01); *H01M 2250/30* (2013.01); *Y02B 90/18* (2013.01)

(58) Field of Classification Search
None
See application file for complete search history.

(56) References Cited

U.S. PATENT DOCUMENTS

| 5,801,345 | A | * | 9/1998 | Mikula-Curtis et al. | 200/5 A |
| 5,969,320 | A | * | 10/1999 | Leeper et al. | 235/380 |
| 2002/0090540 | A1 | * | 7/2002 | Einhart et al. | 429/32 |
| 2003/0142467 | A1 | | 7/2003 | Hachiya et al. | |
| 2004/0197635 | A1 | * | 10/2004 | Ito et al. | 429/34 |
| 2005/0053808 | A1 | | 3/2005 | Chang et al. | |
| 2006/0011461 | A1 | * | 1/2006 | Chan et al. | 200/344 |
| 2006/0246342 | A1 | * | 11/2006 | MacPhee | 429/40 |
| 2007/0015551 | A1 | | 1/2007 | Iwama et al. | |
| 2007/0072042 | A1 | * | 3/2007 | Lam et al. | 429/34 |
| 2007/0196715 | A1 | | 8/2007 | Shu et al. | |

FOREIGN PATENT DOCUMENTS

| EP | 1672464 | 6/2006 |
| JP | 2000148307 | 5/2000 |
| WO | 0035032 | 6/2000 |
| WO | 2007037422 | 4/2007 |
| WO | 2007117212 | 10/2007 |

* cited by examiner

*Primary Examiner* — Maria J Laios
(74) *Attorney, Agent, or Firm* — Moffat & Co.

(57) ABSTRACT

A mobile device having: a keyboard; a printed circuit board having at least one contact responsive to the keyboard; and a fuel cell assembly having: a fuel cell located between the keyboard and the printed circuit board, the fuel cell having a membrane and at least one aperture corresponding with the at least one contact; a tank adapted to store a fuel for the fuel cell; and piping connecting the tank with the fuel cell, where the fuel cell ventilates through the keyboard. Alternatively, the fuel cell acts as the printed circuit board and at least one contact for the keyboard is printed onto the fuel cell.

9 Claims, 9 Drawing Sheets

LOCATION OF A FUEL CELL ON A MOBILE DEVICE

RELATED APPLICATIONS

The present disclosure is a continuation of U.S. patent application Ser. No. 12/394,641, filed Feb. 27, 2009, the entire contents of which are incorporated herein by reference.

FIELD OF THE DISCLOSURE

The present disclosure relates to fuel cell assemblies and in particular to fuel cell assemblies for mobile devices.

BACKGROUND

A fuel cell is an electric generating cell that converts fuel to electricity in an electrochemical energy conversion process. Fuel cells are different from batteries in that they consume a reactant, which must be replenished. Fuel cells, in the electrochemical reaction, convert the fuel from the anode side to mix with an oxidant on the cathode side, resulting in a reaction that has, in one type of fuel cell, a by-product of water and heat.

In current designs of mobile devices, the battery is generally located at the back of the device in order to allow a user access to the battery compartment. Specifically, a user may need to change the battery or at the initialization of the device may need to insert the battery, and therefore access to a battery compartment is generally provided on the back of the device.

BRIEF DESCRIPTION OF THE DRAWINGS

The present application will be better understood with reference to the drawings, in which.

DETAILED DESCRIPTION OF THE DRAWINGS

The present disclosure provides a mobile device comprising: a keyboard; a printed circuit board having at least one contact responsive to the keyboard; and a fuel cell assembly having: a fuel cell located between the keyboard and the printed circuit board, said fuel cell having a membrane and at least one aperture corresponding with the at least one contact; a tank adapted to store a fuel for the fuel cell; and piping connecting the tank with the fuel cell membrane, wherein the fuel cell ventilates through the keyboard.

The present disclosure further provides a mobile device comprising: a keyboard; and a fuel cell assembly having: a fuel cell forming a printed circuit board for the mobile device, the fuel cell having a membrane and at least one contact responsive to the keyboard; a tank adapted to store a fuel for the fuel cell; and piping connecting the tank with the fuel cell membrane, wherein the fuel cell ventilates through the keyboard.

Figure 1:
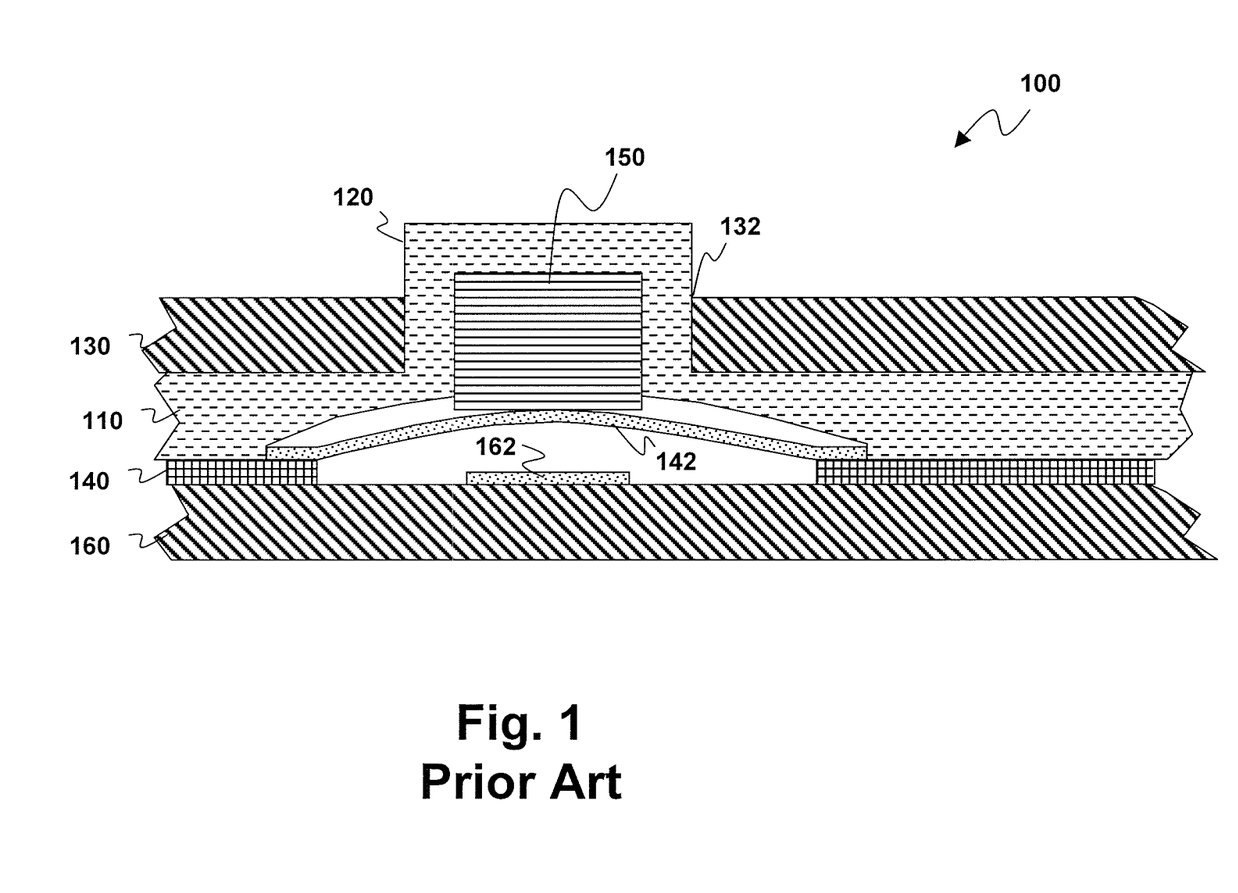
FIG. 1 is a cross-sectional view of an exemplary prior art keyboard.

Reference is now made to FIG. 1. FIG. 1 shows an exemplary cutaway section of a keyboard 100. Keyboard 100 includes a key web 110 containing a plurality of keys. As an example, key 120 is shown. Key web 110 fits under device housing section 130, which includes apertures 132 to accommodate a key 120.

Key web 110 sits over a dome actuator panel 140 having a plurality of dome actuators 142 therein. Dome actuators 142 are resiliently biased to push a plunger 150 within key 120 into an upright position. Alternatively, the resiliency can be accomplished within key web 110 itself.

Dome actuator panel 140 is over a printed circuit board (PCB) 160. PCB 160 contains a plurality of contacts 162.

In operation, a user presses key 120, which forces plunger 150 into actuator dome 142. Actuator dome 142 flexes and makes contact with contact 162, completing a circuit and causing a key stroke to be registered on the device.

The present disclosure is not meant to be limited by the number or orientation of keys 120 within a device housing section 130, and a plurality of such configurations would be known to those in the art.

In some prior embodiments, instead of having a dome actuator 142, key web 120 could be resilient enough to provide elasticity to return key 120 into its upright position. In this case plunger 150 could be formed of a conducting material that would close a connection on contact 162 thereby causing the key stroke to be registered.

Other embodiments of keypads or keyboards would also be known to those in the art and the present disclosure is not made to be limited to a particular type of keyboard actuation.

Figure 2:
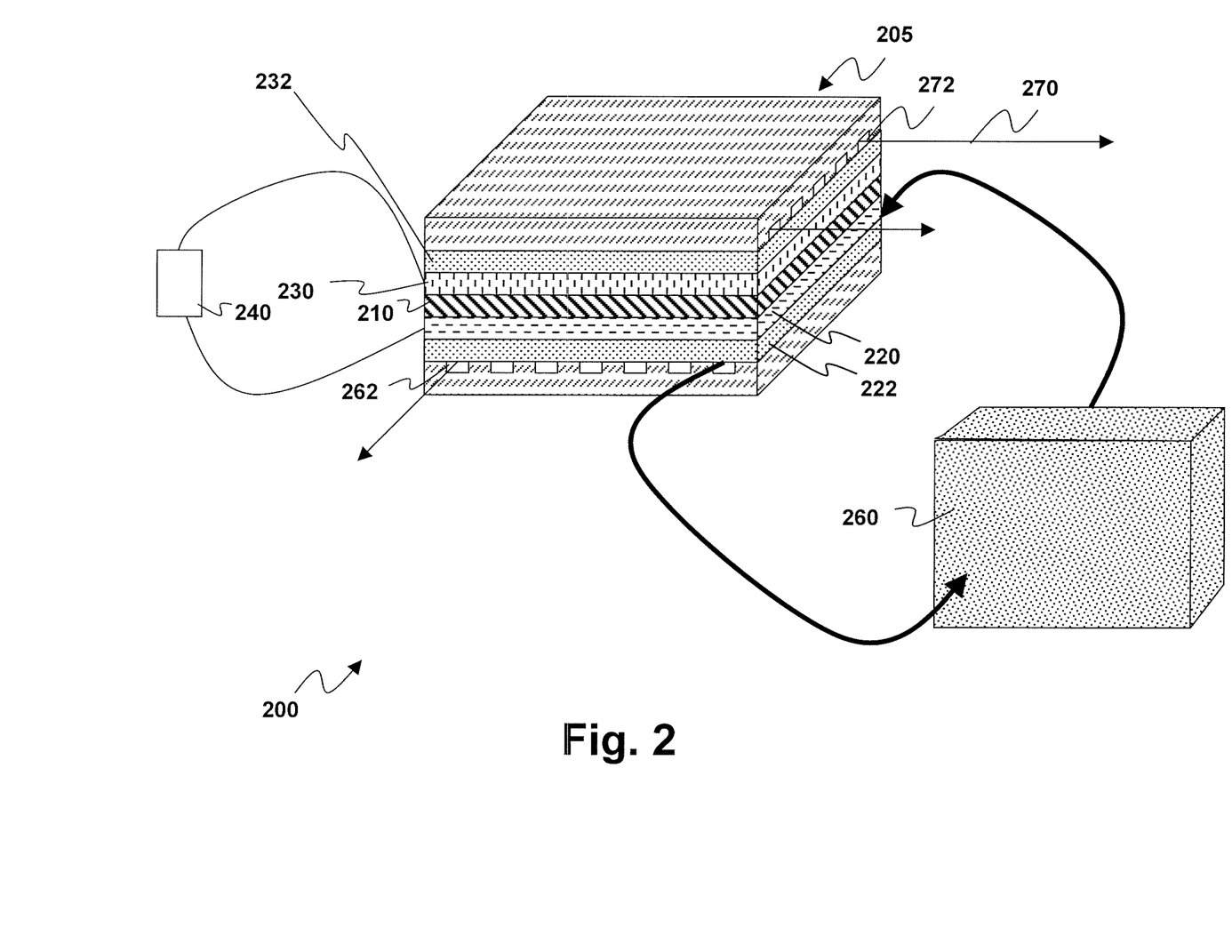
FIG. 2 is a perspective view of an exemplary fuel cell assembly.

A fuel cell assembly may be added to a mobile device in order to provide for an extended energy life. In particular, the use of a fuel cell assembly could extend the power provision over a conventional battery and thus could be desirable for mobile devices. Fuel cell assemblies are known in the art, and one example of a fuel cell assembly is illustrated with respect to FIG. 2. The fuel cell assembly of FIG. 2 is not to be limiting however and other fuel cells would be applicable to the present disclosure. As used herein, a fuel cell assembly includes both a fuel cell and the apparatus allowing a fuel cell to work, including but not limited to the tank and associated piping.

Fuel cell assembly 200 of FIG. 2 includes a variety of layers.

In the case that fuel cell assembly 200 of FIG. 2 is a proton exchange membrane fuel cell, a fuel cell 205 consists of a polymer electrode membrane 210 that is displaced between an anode 220 and a cathode 230. The polymer electrolyte membrane 210 is provided to only allow the exchange of protons between anode 220 and cathode 230 but does not allow electrons to flow in this way. This causes the electrons to flow through a circuit 240 thereby powering the circuit.

Other layers include backing layers 222 and 232 for anode 220 and cathode 230 respectfully.

In operation a fuel such as a hydrogen gas flows from a storage tank 260 through channels 262 and back into storage tank 260 for any unused fuel.

Similarly, an oxidant 270 flows through channels 272 and is adapted to react with the fuel to form heat and water. Thus, the only waste product in this case is either liquid or vapour.

In the above, the anode is the negative post of fuel cells and has several jobs. It conducts electrons that are freed from the hydrogen molecules to be used in circuit 240.

The cathode is the positive side of the fuel cell and has the job of connecting the electrons back from the external circuit to catalyst.

The polymer electrolyte membrane 210 is a specially treated material that conducts only positively charged ions. Thus, the membrane blocks electrons and causes them to bypass the membrane through circuit 240.

In an alternate embodiment, instead of a proton exchange membrane fuel cell, a polymer exchange fuel cell could be utilized. This is similar in that it has an anode and cathode separated by a proton exchange membrane. In this case a catalyst also exists between the proton exchange membrane and the cathode to facilitate the reaction of the oxygen and hydrogen. In one embodiment it is made of platinum nano-particles that are very thinly coated onto carbon paper or cloth. The catalyst is rough and porous so that a large surface area on the platinum could be exposed to the hydrogen or oxygen.

The above therefore provides for a system having a fuel cell portion such as fuel cell 205, which includes a membrane, and a fuel storage portion such as storage tank 260. Further a circuit portion such as circuit 240 can be driven from the fuel cell assembly 200.

In mobile devices one place to place the fuel cell is at the back of the unit where the vent, water vapour and heat can be vented through a grate. Problems with this include that the fuel cell takes up extra space and there is increased heat retention in the device. Further, devices tend to be placed on their back with keys facing upwards in most configurations, thereby blocking the grate and causing the heat to rise into the device.

Figure 3:
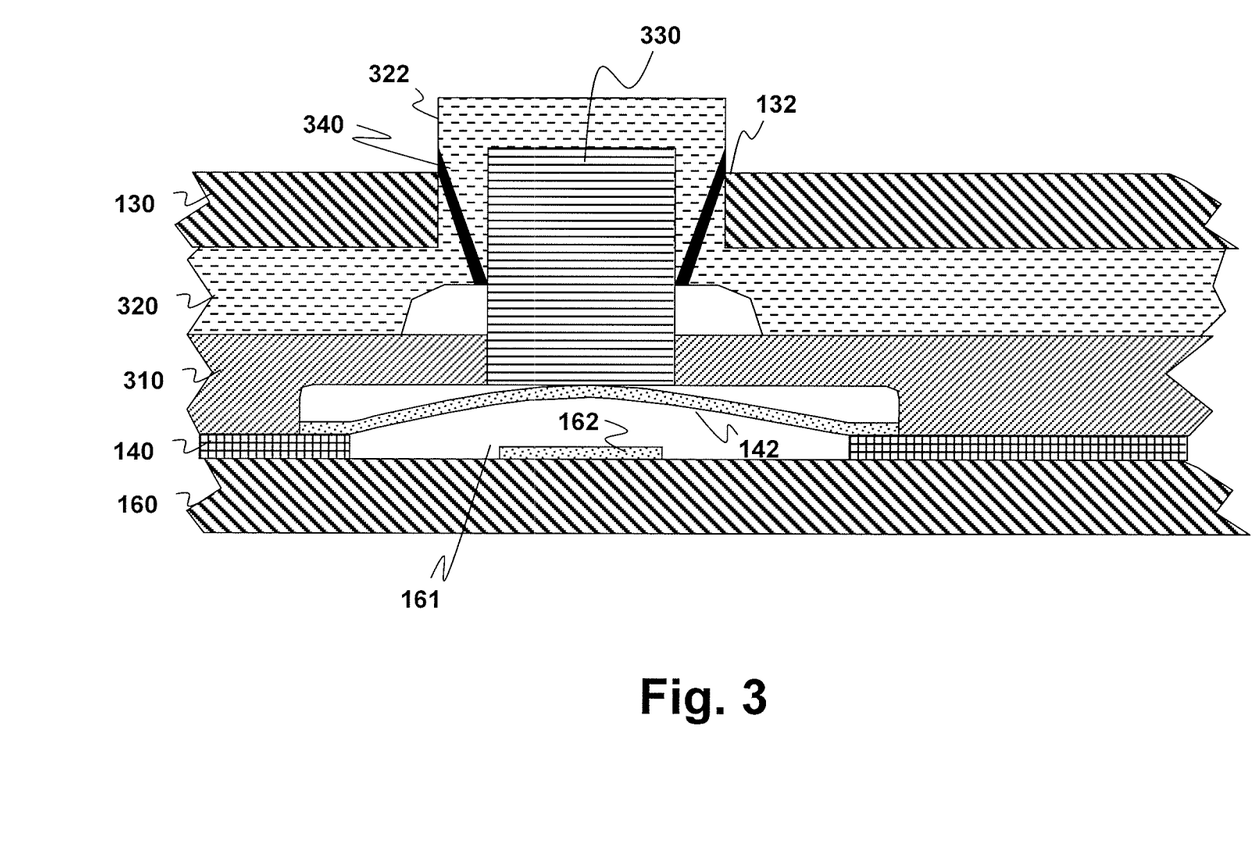
FIG. 3 is a cross-sectional view of a keyboard having a fuel cell membrane inserted therein.

Reference is now made to FIG. 3. Similar reference numerals as used in FIG. 1 are used with reference to FIG. 3. In particular, a printed circuit board 160 includes a switch 161 having a contact 162 thereon. In the example of FIG. 3 a dome actuator 142 is adapted to be depressed and make contact and make contact 162 thereby completing the circuit and causing a keystroke to be registered. Dome actuator 142 sits on dome actuator panel 140.

In accordance with the present disclosure a fuel cell 310 is added above dome actuator panel 140. Such a fuel cell could be fuel cell 205 from FIG. 2.

A key web 320 sits above fuel cell 310 and includes a series of keys 322 protruding there from. A device housing section 130 includes a series of apertures 132 therein to allow a key 322 to protrude there from.

A plunger 330 extends from key 322 to make contact with dome actuator 142.

Vents 340 are provided within key 322 to allow heat and vapour to escape from fuel cell 310 through the keypad of the mobile device.

As will be appreciated, in order to ensure a similar length of travel for a key depression, plunger 330 could be made longer than plunger 150 of FIG. 1 in order to allow it to proceed through fuel cell 310 to actuate the dome actuator 142.

Several advantages are accomplished by putting the fuel cells under the phone keypad. A first advantage is that the key becomes a porous grill and with the fuel cell underneath allows for more natural venting. This also provides for airflow under the fuel cell as well. In addition, by placing the fuel cell under the keypad, minimal additional space is required to accommodate the fuel cell.

The embodiment of FIG. 3 also allows for more heat dissipation since the keypad is on top of the unit and not underneath it. Therefore heat will rise through the keypad when the device is left in a cradle or laid on its back.

A further advantage is that on the backside of the mobile device, dirt will tend to build up since this is often the side that is placed down. This tends to clog any grate that is on the back of the mobile device.

As will be appreciated, as an alternative to FIG. 3 a dome actuator 142 may not be included and instead plunger 330 would be conductive, thus triggering the switch when in contact with contact 162. In this case, key web 320 needs to be resilient enough to bring the key back into its upright position once it is released but the remainder of the process works in the same way.

Figure 4:
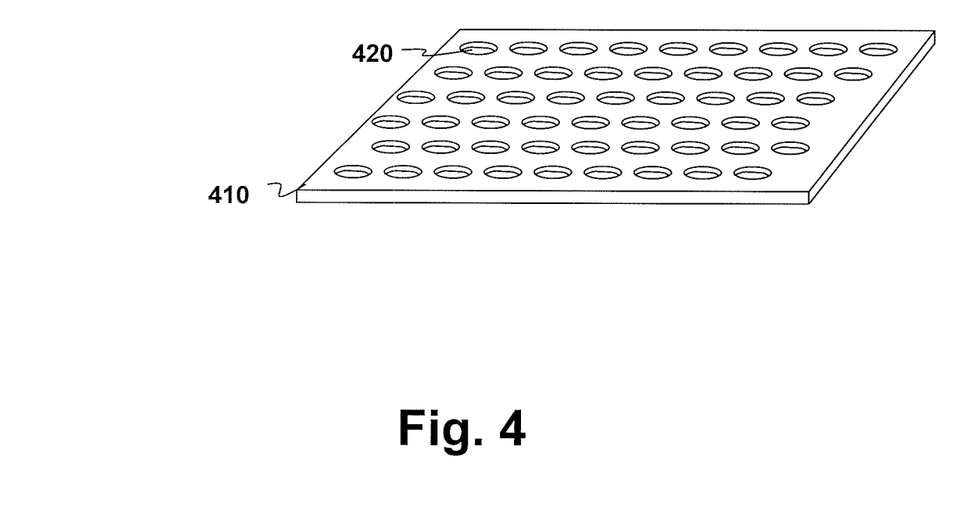
FIG. 4 is a perspective view of a fuel cell membrane as used in FIG. 3.

A fuel cell is illustrated with respect to FIG. 4. FIG. 4 shows a fuel cell 410 having a membrane, which in one embodiment could be the same as fuel cell 310 from FIG. 3. As is seen, a series of holes 420 are provided in fuel cell 410 to allow plungers such as plunger 330 to proceed through and to make contact with contact 162 either through a dome actuator or directly.

In some embodiments it may possible for the fuel cell membrane to have circuits printed on it, and thus the fuel cell itself becomes the printed circuit board.

Figure 5:
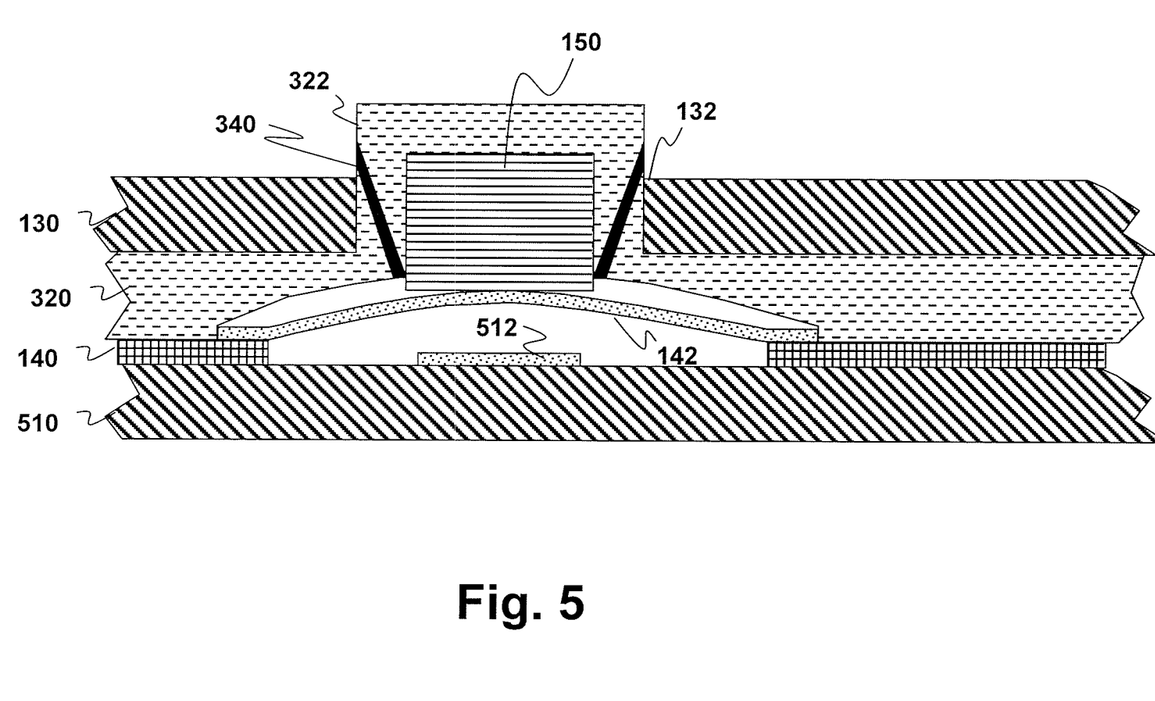
FIG. 5 is a cross-sectional view of an alternative embodiment of a keyboard in which a fuel cell membrane forms part of the printed circuit board.

Reference is now made to FIG. 5. FIG. 5 shows a fuel cell 510 in which circuits are printed thereon. In particular, a contact 512 is printed onto the fuel cell 510.

A dome actuator panel 140 contains a plurality dome actuators 142 which are adapted to make contact with contact 512.

A key web 320, forming a portion of the keyboard of a device, sits above dome actuator panel 140 and includes a plurality of keys 322 therein. Keys 322 are adapted to protrude through an aperture 132 of device housing section 130 and a plunger 150 is adapted to depress dome actuator 142 into contact 512.

Key web 320 includes a series of ventilation holes 340 to allow heat and water vapour to escape from fuel cell 510, thereby providing the advantages of the present disclosure. The ventilation holes facilitate heat and water vapour dissipation, which are by-products of the fuel cell. Also, a device when placed on a surface is usually placed in its back. By having the ventilation holes 340 in the key web, and thereby in the upward facing keyboard, the holes will not be plugged as easily with dirt as they would be if located in the back of a mobile device. Since heat rises, heat dissipation is further enhanced in the configuration of FIG. 3.

A further advantage of ventilation through a keyboard is the greater surface area for potential ventilation. Specifically, devices that ventilate through a hole in a back or side of the device have one location for water vapour to escape, leading to more condensation and less heat and vapour dissipation. The keyboard of a device typically has a key web with multiple keys. If each has ventilation holes 340, the ventilation of the device is spread over a larger area, making ventilation more efficient and potentially reducing condensation that could affect a user of the device.

Figure 6:
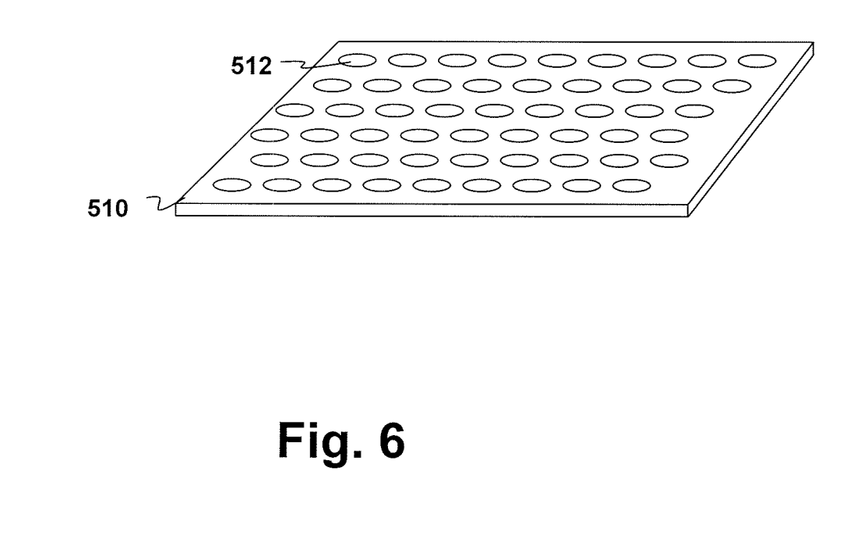
FIG. 6 is a perspective view of the combination fuel cell membrane and printed circuit board of FIG. 5.

Referring to FIG. 6. Fuel cell 510 includes contacts 512. As seen from FIG. 6, a plurality of contacts 512 are configured on fuel cell 510. The configuration of the keys will be determined by the mobile device and the present disclosure is not meant to be limited to any particular configuration of contacts 512. As will be appreciated with reference to FIGS. 5 and 6, venting of water vapour and heat can be done around actuators 142 or can be done through ports in key web 320 and dome actuator panel 140.

Light can be projected through the fuel cell 510, 410, 310 or 205 either by introducing "light pipes" in the membrane to allow light to filter through, or by forming the fuel cell such that it is transparent enough to allow light to proceed through the membrane, thereby allowing for the illumination of keys.

Figure 7:
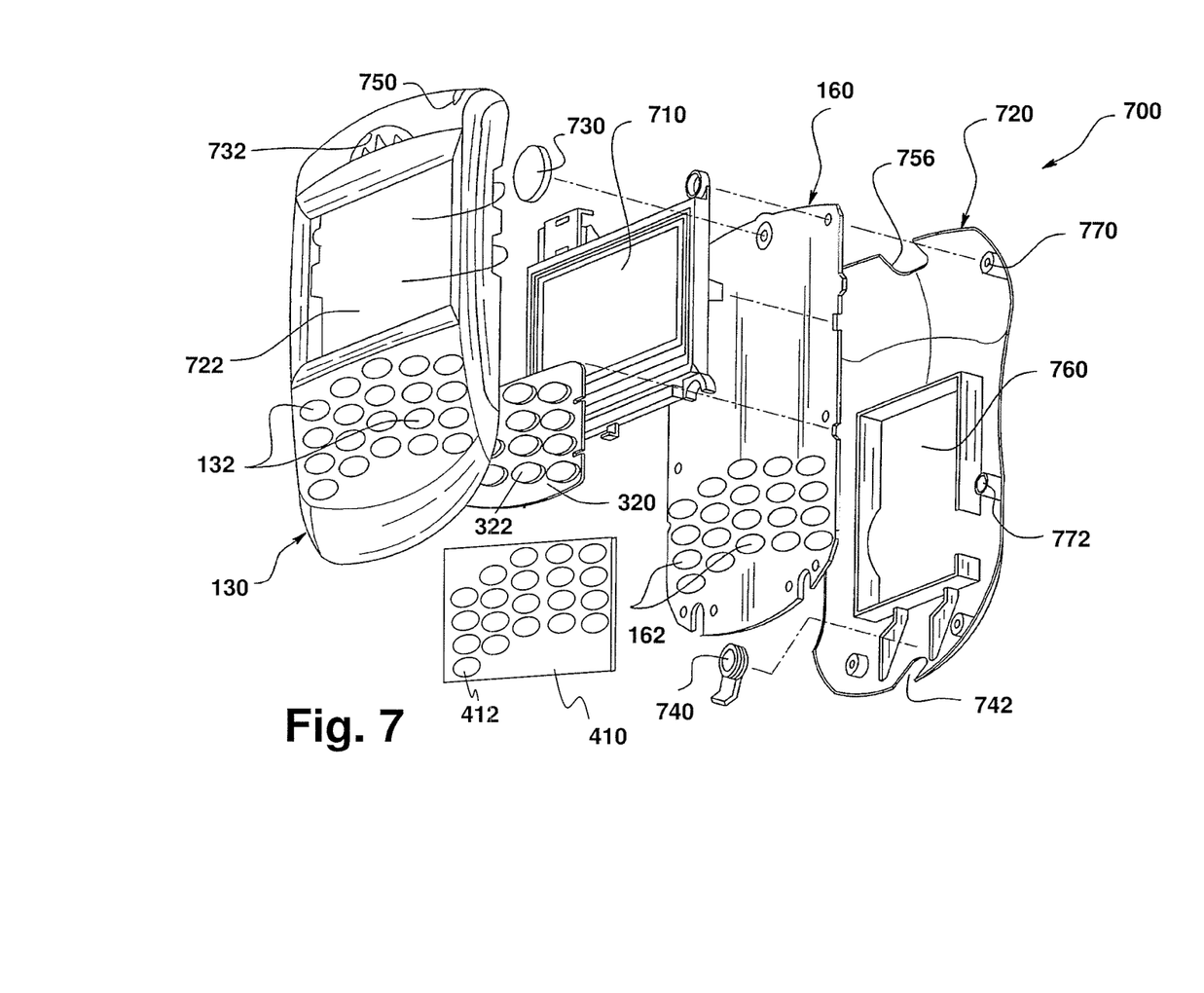
FIG. 7 is an exploded view of a mobile device having the fuel cell membrane of FIG. 4.
Figure 8:
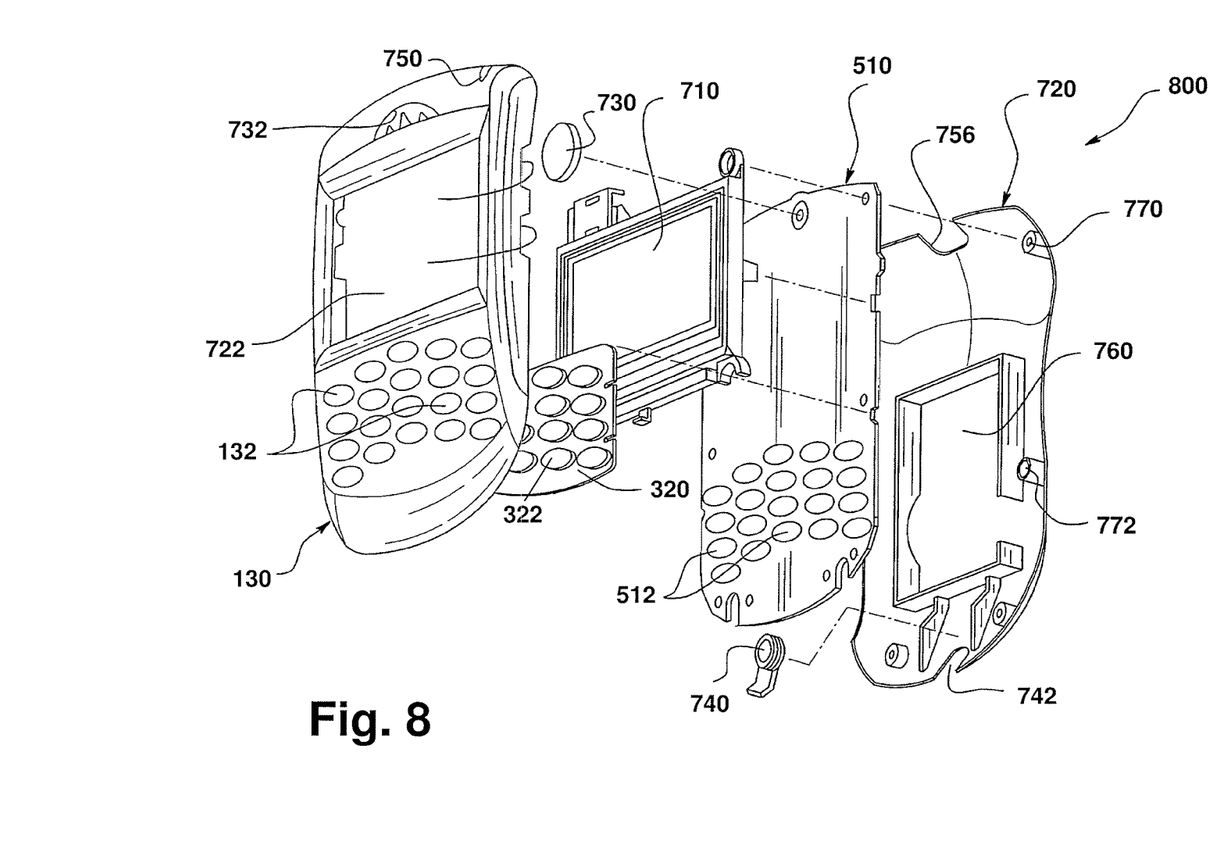
FIG. 8 is an exploded view of a mobile device utilizing a combination printed circuit board and fuel cell membrane.

An exemplary device structure is shown in FIGS. 7 and 8. This structure is only an example and other configurations are possible.

Referring to FIG. 7, a device 700 includes a printed circuit board 160. Most of the internal components of the mobile communication device are preferably mounted on the PCB 160. The keyboard is preferably formed with a key web 320 over a plurality of contacts 162 on the PCB 160. The key web 320 and a plurality of contacts 162 are configured such that each key in the key web 320 contacts and operates one of the contacts 162 when the key is depressed. Other configurations might also be implemented as indicated above. Further, these implementations may include the number of contacts 162 being less than the number of keys 322, or the number of contacts 162 may be greater then the number of keys 322 on key web 320.

Key web 320 and contacts 162 are also positioned such that apertures 132 on device housing section 130 are at least partially exposed to keys 322. Portions of the key web 320 are exposed by the apertures 132 to provide key surfaces that may be depressed by a user to provide data input to the device 700. Such data input may, for example, be used to generate data communications on the device 700.

A fuel cell 410 having a series of holes 412 therein is adapted to be placed between the key web 320 and contacts 162, whereby holes 412 align with contacts 162 to allow a contact from a plunger (not shown) of key web 322 to make contact with contact 162.

A display 710 is preferably mounted on the PCB 160 as shown in FIG. 7. When the device housing section 130 and a second device housing section 720 are coupled together, an aperture 722 in the housing section 130 at least partially exposes the display 710. The aperture 722 in the device housing section 130 and the display 710 on PCB 160 may be positioned such that a viewing area of the display 710 is exposed. The frame and other components associated with the display 710 are preferably hidden from view when the first and second device housing sections 130 and 720 are coupled together. A speaker 730 is preferably mounted at or near the top of PCB 160. One or more apertures 732 are positioned to or at least partially expose the speaker 730 when the device housing portions 130 and 720 are coupled together.

A microphone 740 is mounted in the second device housing section 720. The microphone 740 is at least partially exposed by an aperture 742 in the second device housing section 720, and coupled to the PCB and other device components. Audio and/or voice inputs to the microphone 740 may be used, for example, to generate voice communications. When the microphone 740 is positioned in the housing, an aperture (not shown) is provided in the first device housing section 132 at least partially expose the microphone 740. The microphone 740 may alternatively be mounted to the device housing section 130 or PCB 160.

Device housing sections 130 and 720 may include further apertures to expose or partially expose other device components. In the first device housing section 130, apertures 750, 752 and 754 are configured to partially expose the auxiliary input/output (I/O) devices. An aperture 756 is similarly positioned in device housing section 720 to at least partially expose and auxiliary input/output device. An aperture 760 is adapted to accommodate the fuel tank such as fuel tank 260 from FIG. 2. As will be appreciated, the configuration of FIG. 7 provides the further advantage that heat is absorbed by tank 260, and thus placing it under PCB 160 is beneficial.

As will be appreciated, fuel tank 260 can be connected to fuel cell 410 through the use of micro-valves and piping to provide for the flow of the fuel through fuel cell 410.

Various affixing portions such as 770 and 772 may be adapted to receive screws to hold PCB 160 and casing 130 and casing 720 together.

The above is not meant to be limiting and other components may be provided within device 700.

Similarly, referring to FIG. 8, this figure utilizes similar reference numerals to those in FIG. 7 for mobile device 800, with the exception of PCB 160 from FIG. 7 being replaced by fuel cell 510 and contacts 162 being replaced by contacts 512. In this way, the functionality of PCB 160 is replaced by a fuel cell which can act as a printed circuit board.

Figure 9:
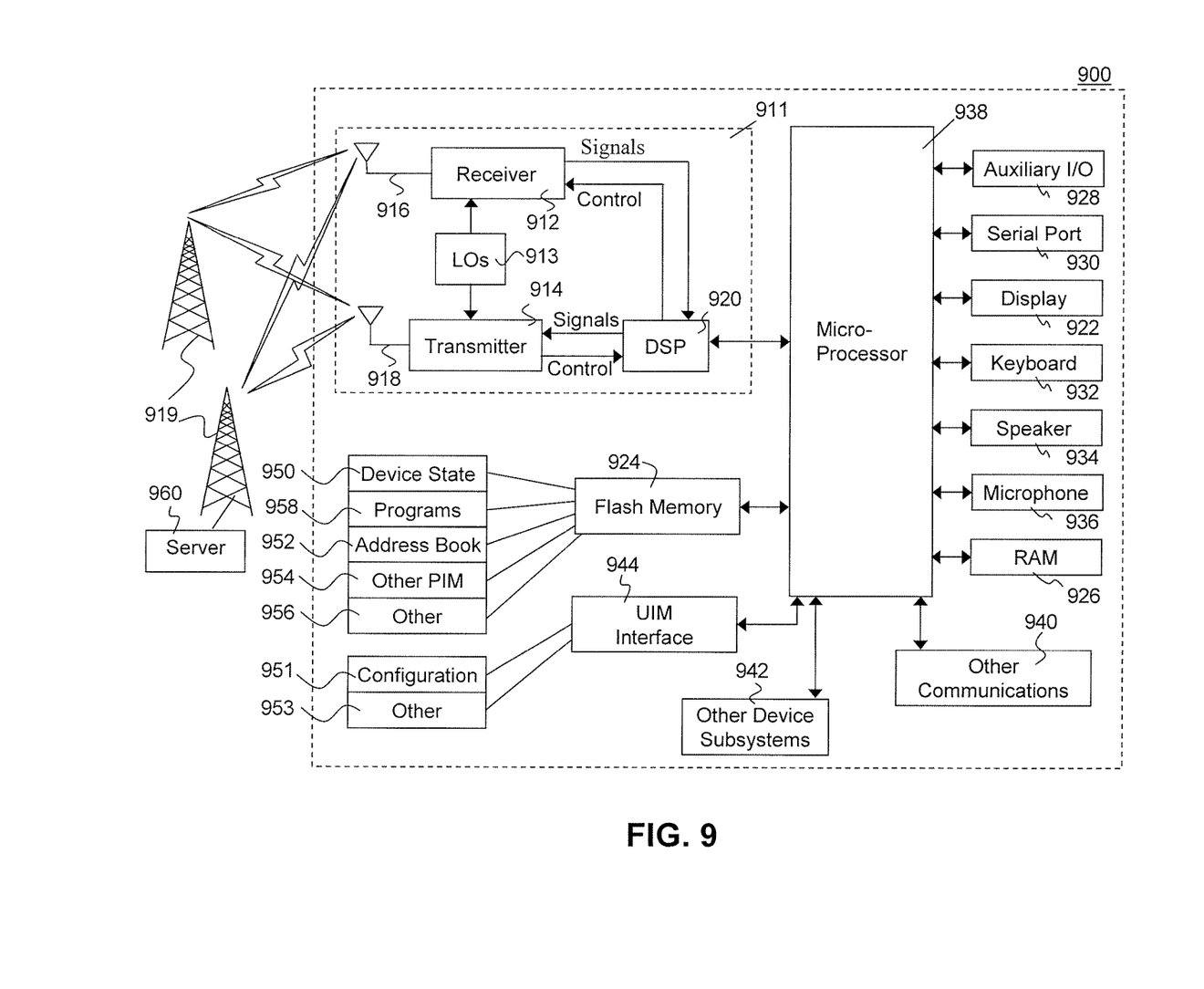
FIG. 9 is a block diagram of an exemplary mobile device apt to be used with the present disclosure.

The above can be implemented on any mobile device. Such mobile devices include, but are not limited to, personal digital assistants, cellular telephones, wireless data devices, among others. Reference is now made to FIG. 9. The circuits shown on mobile device 900 can be powered by a fuel cell assembly, as illustrated in FIG. 2.

Mobile device 900 is preferably a two-way wireless communication device having at least voice and data communication capabilities. Mobile device 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate.

Mobile network 900 could be any network including but not limited to: the global system for mobile communications (GSM), general packet radio service (GPRS), code division multiple access (CDMA), universal mobile telecommunications system (UMTS), wideband code divisional multiple access (WCDMA) among others. These technologies allow the use of voice, data or both at the same time.

Network access requirements will also vary depending upon the type of network 919. For example, In UMTS and GPRS networks, network access is associated with a subscriber or user of mobile device 900. For example, a GPRS mobile device therefore requires a subscriber identity module (SIM) card in order to operate on a GPRS network. In UMTS and LTE a USIM or SIM module is required. In CDMA a RUIM card or module is required. These will be referred to as a UIM interface herein. Without a valid UIM interface, a mobile device may not be fully functional. Local or non-network communication functions, as well as legally required functions (if any) such as emergency calling, may be available, but mobile device 900 will be unable to carry out any other functions involving communications over the network 900. The UIM interface 944 is normally similar to a card-slot into which a card can be inserted and ejected like a diskette or PCMCIA card. The UIM card can have approximately 64K of memory and hold many key configuration 951, and other information 953 such as identification, and subscriber related information.

When required network registration or activation procedures have been completed, mobile device 900 may send and receive communication signals over the network 919. Signals received by antenna 916 through communication network 919 are input to receiver 912, which may perform such common receiver functions as signal amplification, frequency down conversion, filtering, channel selection and the like, and in the example system shown in FIG. 9, analog to digital (A/D) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 919 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Network 919 may further communicate with multiple systems, including a server 960 and other elements (not shown). For example, network 919 may communicate with both an enterprise system and a web client system in order to accommodate various clients with various service levels.

Mobile device 900 preferably includes a microprocessor 938 which controls the overall operation of the device. Communication functions, including at least data communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926. Further, a unique identifier is also preferably stored in read-only memory.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile device. A predetermined set of applications that control basic operations, including at least data and voice communication applications for example, will normally be installed on mobile device 900 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 919. In a preferred embodiment, the PIM data items are seamlessly integrated, synchronized and updated, via the wireless network 919, with the mobile device user's corresponding data items stored or associated with a host computer system. Further applications may also be loaded onto the mobile device 900 through the network 919, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the mobile device 900. These applications will however, according to the above, in many cases need to be approved by a carrier.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile device 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile device 900 is similar, except that received signals would preferably be output to a speaker 934 and signals for transmission would be generated by a microphone 936. Alternative voice or audio I/O subsystems, such as a voice message recording subsystem, may also be implemented on mobile device 900. Although voice or audio signal output is preferably accomplished primarily through the speaker 934, display 922 may also be used to provide an indication of the identity of a calling party, the duration of a voice call, or other voice call related information for example.

Serial port 930 in FIG. 9 would normally be implemented in a personal digital assistant (PDA)-type mobile device for which synchronization with a user's desktop computer (not shown) may be desirable. Such a port 930 would enable a user to set preferences through an external device or software application and would extend the capabilities of mobile device 900 by providing for information or software downloads to mobile device 900 other than through a wireless communication network. The alternate download path may for example be used to load an encryption key onto the device through a direct and thus reliable and trusted connection to thereby enable secure device communication.

Alternatively, serial port 930 could be used for other communications, and could include as a universal serial bus (USB) port. An interface is associated with serial port 930.

Other communications subsystems 940, such as a short-range communications subsystem, is a further optional component which may provide for communication between mobile device 900 and different systems or devices, which need not necessarily be similar devices. For example, the subsystem 940 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A fuel cell operated device comprising:
   a fuel cell having a membrane and a printed circuit disposed on a first side on the fuel cell, the printed circuit included a plurality of spaced-apart keyboard contacts;
   a tank adapted to store a fuel for the fuel cell;
   a key web comprising a plurality of keys, each of the plurality of keys being disposed above one of the plurality of keyboard contacts; and
   piping connecting the tank with the fuel cell;
   wherein the key web comprises a plurality of ventilation holes, the ventilation holes being in fluid communication with the first side of the fuel cell.

2. The fuel cell operated device of claim 1, wherein the fuel cell is configured to be located under a keyboard.

3. The fuel cell operated device of claim 1, wherein the fuel cell includes light pipes.

4. The fuel cell operated device of claim 1, wherein the fuel tank is located below the fuel cell.

5. The fuel cell operated device of claim 1, wherein the fuel cell is transparent such that light can pass through the fuel cell.

6. The fuel cell operated device of claim 1, wherein at least one of the plurality of spaced-apart keyboard contacts can be contacted by a second contact to complete a circuit when a keyboard key is actuated.

7. The fuel cell operated device of claim 1, further comprising at least one dome actuator for selectively contacting a one of the plurality of spaced-apart keyboard contacts to complete a circuit, the one of the plurality of spaced-apart keyboard contacts being disposed between the fuel cell membrane and the at least one dome actuator.

8. The fuel cell operated device of claim 7, further comprising a dome actuator panel having the at least one dome actuator.

9. The fuel cell operated device of claim 8, wherein the dome actuator panel defines ventilation ports therethrough for allowing for ventilation of the fuel cell through the ports.

* * * * *